2,776,626

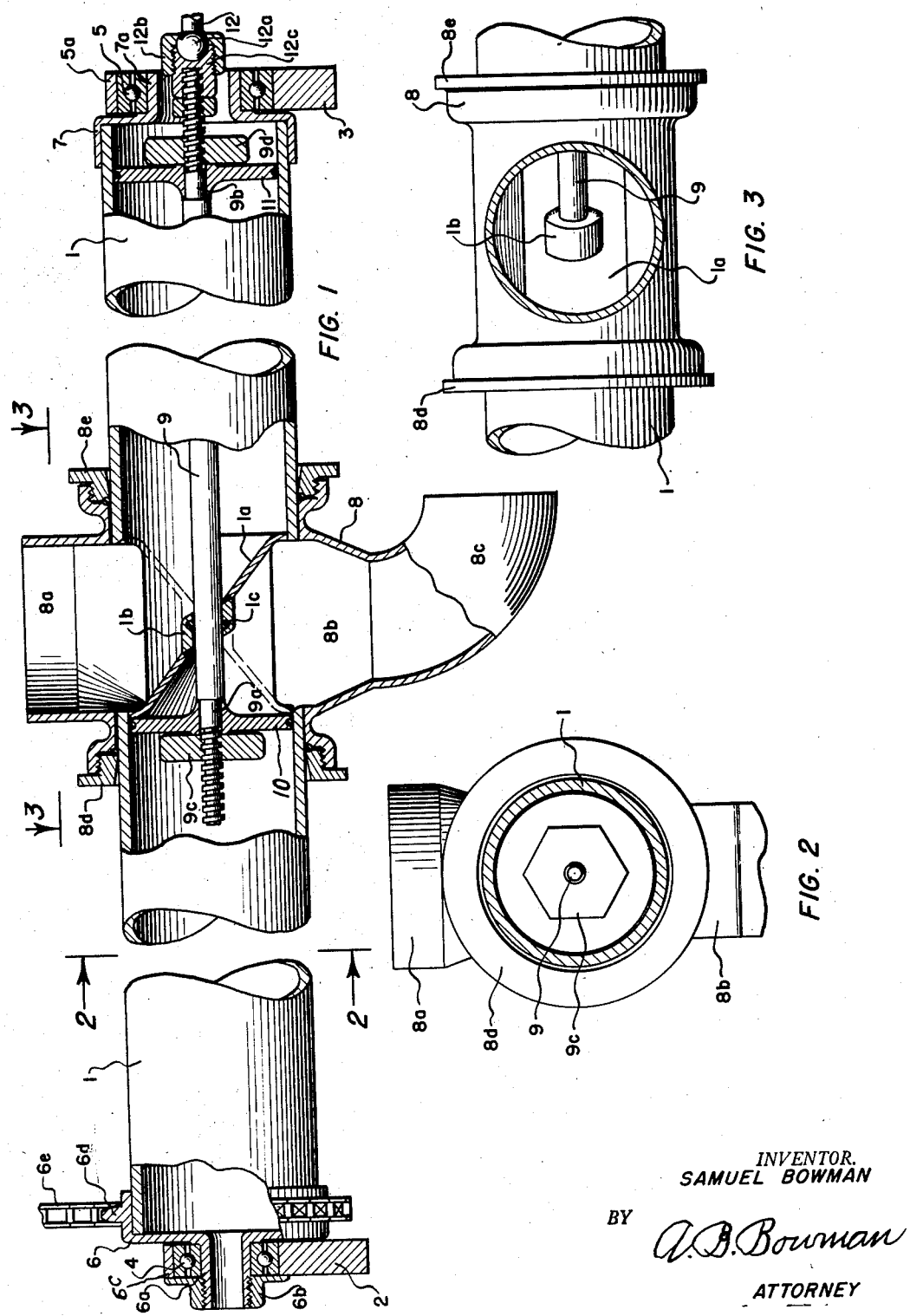

CHEESE PUMP AND FILLER

Samuel Bowman, Glendale, Calif.

Application October 7, 1952, Serial No. 313,561

6 Claims. (Cl. 103—159)

My invention relates to a cheese pump and filler more particularly to a pump for pumping cheese of the cottage cheese type from the mixers and pumping it into receptacles for delivery purposes or the like and the objects of my invention are:

First, to provide a pump for various uses which provides a substantially continuous flow of the product pumped.

Second, to provide a plunger so arranged within the cylinder that it reduces the scoring of the cylinder to a minimum.

Third, to provide a pump of this class in which the areas for the flow of the product is substantially equal throughout the pumping area as well as the inlet and outlets.

Fourth, to provide a pump and filler of this class particularly adapted for cheese of the cottage type which does not break up the curds of cheese as they come from the mixer.

Fifth, to provide a double action pump of this class in which the valve for the shifting of the flow is an angular partition fixed in the cylinder and the cylinder is revolved a one half revolution and back to provide the valve for the shift from one end of the cylinder to the other.

Sixth, to provide a pump and filler of this class in which there is substantially no leak of the product from the pump during the pumping operation, and Seventh, to provide a pump and filler of this class which is very simple and economical of construction, easy to operate, efficient in its action and which will not readily deteriorate or get out of order.

With these and other objects in view as will appear hereinafter my invention consists of certain novel features of construction, combination, and arrangement of parts and portions as will be hereinafter described in detail and particularly set forth in the appended claims reference being had to the accompanying drawings and to the characters of reference thereon which form a part of this application in which:

Figure 1 is a fragmentary side elevational view of my cheese pump and filler showing portions broken away and in section to facilitate the illustration. Fig. 2 is a fragmentary sectional view taken from the line 2—2 of Fig. 1 and Fig. 3 is a fragmentary sectional view taken from the line 3—3 of Fig. 1.

Similar characters of reference refer to similar parts and portions throughout the several views of the drawings.

The cylinder 1 cylinder supports 2 and 3, cylinder supporting bearings 4 and 5, cylinder end caps 6 and 7, inlet and outlet member 8, plunger shaft 9, plunger members 10 and 11, and operating shaft 12 constitute the principle parts and portions of my cheese pump and filler.

All of the parts and portions of my cheese pump and filler are preferably made of stainless steel. The cylinder 1 is a tubular member preferably finished on the inner surface to provide a smooth bore for the plunger. It is provided on one end part with a cap member 6 which is welded or otherwise secured thereon to form a tight, rigid fit with the cylinder 1. It is provided with a reduced portion 6a on which are mounted ball bearings 4 which ball bearings are held in position by means of a cap member 6b and with a cover plate 6c. This bearing 4 is supported on a cylinder support 2. This cap member 6 is also provided with sprocket teeth 6d arranged for a chain drive with the chain 6e. The opposite end part of the cylinder 1 is provided with the cap member 7 which is provided with a reduced portion 7a on which are mounted ball bearings 5 which ball bearings are supported on the cylinder support 3 said ball bearings are provided with a cap member 5a.

Mounted intermediate the ends of the cylinder 1 is the inlet and outlet member 8 which is provided with an extended inlet portion 8a which is arranged to communicate with the outlet of a mixing machine or other product outlet and this member 8 is also provided with outlet portion 8b which is preferably provided with an extended curved portion 8c which is adapted to connect with a receptacle or vessel to be filled by the operation of the pump. This inlet portion or opening 8a of the member 8 communicates with the interior of the cylinder 1 by means of an opening in the cylinder which opening is substantially the same area as the inlet portion 8a and also substantially the area of the interior of the cylinder. The outlet portion or opening 8b of the member 8 also communicates with the cylinder 1 on the opposite side of the cylinder from the inlet opening. This inlet and outlet member 8 is held in a position against turning by its connection with the mixer or other product producer for which the pump is used while the cylinder 1 revolves in the member 8 one-hundred and eighty degrees in opposite directions. The member 8 is sealed relatively to the cylinder 1 by means of stuffing boxes 8d and 8e which engage round rubber gaskets for forming a seal between the cylinder 1 and the member 8 on opposite sides. This cylinder 1 is provided with an angular partition 1a which entirely fills the cylinder and is secured to the cylinder and extends to the opposite sides of the inlet 8a and outlet 8b as shown by solid lines in Fig. 1 of the drawings but when the cylinder 1 together with this partition is revolved one-hundred and eighty degrees the partition takes the position shown by dash lines in Fig. 1 of the drawings, thus shifting the inlet and outlet to the cylinder from one end to the other with the reciprocation of the plunger in the cylinder. This partition 1a is provided with a central hub like portion 1b which is provided with a small round rubber gasket 1c to prevent leakage through the partition 1a past the shaft 9. The plunger shaft 9 is reciprocally mounted in this hub like portion 1b and is provided with reduced portions 9a and 9b with threaded ends and on these threaded ends are positioned nuts 9c and 9d. Interposed between these nuts and the larger portion of the shaft 9 at opposite ends are the plungers 10 and 11 which are secured rigidly in position on the shaft 9 by means of the nuts 9c and 9d. These plunger members 10 and 11 are provided with round rubber gasket seals at their opposite edge which engage the inner wall of the cylinder 1 with the reciprocation of the plungers in the cylinder and also permits revolution of the cylinder relatively to the plunger members 10 and 11. The plunger shaft 9 is operated reciprocally by means of the shaft 12 which is operated by any operating means preferably a hydraulic ram. This shaft 12 is provided with a ball end 12a which is arranged to provide for revolution of the shaft 9 relative to the shaft 12 and is supported in a nut 12b and connection member 12c said portions conforming with the ball 12a on the shaft 12.

The operation of my cheese pump and filler is substantially as follows: The inlet portion 8a of the member 8 is secured in communication with the outlet of a cheese mixer or other products producer and the member 8 held rigidly in position. The sprocket chain 6e is in operative relation with the power producing mechanism not shown and no part of my present invention but preferable a hydraulic ram structure for quick action. The shaft 12 is in operative relation with a reciprocating mechanism not shown for reciprocating the shaft 9 and the two operating mechanisms are synchronized so that when the plungers 10 and 11 reach the end of their strokes at either end, the cylinder is revolved a one half revolution and when the plungers reach the other end of their strokes the cylinder is reversed a one half revolution so that when the plungers are in the position as shown in Fig. 1 of the drawing the cylinder at the right end is filled with the product through the inlet 8a because the partition 1a is in the position shown in solid lines and directs it into that end. As soon as the plungers reach the end of their strokes to the right, the operating mechanism revolves the cylinder through the chain 6e and sprocket 6d, revolving the cylinder a one half revolution whereupon the partition 1a is reversed to the dash line position shown in Fig. 1, so that when the plungers are moved in leftward direction, the product then goes into the leftward end of the cylinder and that which is in the right end of the cylinder goes out through the outlet 8b and 8c into a vessel to be filled. When the plungers reach the left end of their strokes the chain 6e and sprocket 6c again are operated to revolve the cylinder 1 180°, thus providing a substantial continuous flow of the product from the inlet to outlet with the reciprocation of the plunger and the oscillation action of the cylinder, with no retardation of the product to cause curds of cheese or other similar materials to be broken up.

Though I have shown and described a particular construction, combination, and arrangements of parts and portions, I do not wish to be limited to this particular construction, combination, and arrangement but desire to include in the scope of my invention the construction, combination, and arrangement substantially as set forth in the appended claims.

Having thus described my invention what I claim as new and desire to secure by Letters Patent is:

1. In a pump of the character described, the combination of a tubular cylinder, a fixed inlet and outlet member positioned intermediate the ends of said cylinder and in which said cylinder is revolubly mounted, provided with an inlet at one side of said cylinder and an outlet at the other side of said cylinder, an angular partition fixed in said cylinder extending from one side of said inlet to the opposite side of said outlet, dividing said cylinder into two opposite parts and being revoluble with said cylinder, said parts of said cylinder being ported on opposite sides of said angular partition adjacent thereto for communicating said parts of said cylinder alternately with said inlet and outlet of said inlet and outlet member as said cylinder is rotated through approximately one-half revolution on its longitudinal axis, plungers mounted in the ends of said cylinder, means linking said plungers together for simultaneous reciprocation in the opposite parts of said cylinder on opposite sides of said partition, and means for rotating said cylinder approximately one-half revolution on its longitudinal axis, in timed relation to the reciprocation of said plungers.

2. A pump as defined in claim 1 wherein said angular partition has an axial opening therethrough and said means for linking said plungers together comprises a shaft extending through said opening in said partition and having its ends connected to said plungers.

3. In a pump of the character described, the combination of a cylinder structure supported for rotation on its longitudinal axis, said cylinder structure comprising a pair of axially aligned cylinder ends in end-to-end relation, there being a partition separating said cylinder ends, a port in each of said cylinder ends adjacent said partition, said ports being angularly spaced around the longitudinal axis of said cylinder structure, an inlet and outlet member engaging the exterior of said cylinder structure in a position to cover said ports, said inlet and outlet member having angularly spaced inlet and outlet openings for alternate communication with said ports of said cylinder ends as rotary movement is imparted to said cylinder structure, plungers in said cylinder ends, means for linking said plungers together for simultaneous reciprocation in said cylinder ends, and means for applying rotary movement to said cylinder structure in timed relation to the reciprocation of said plungers so that each of said ports in said cylinder ends will alternately communicate with said inlet and outlet openings, and that when each of said ports is in communication with said inlet opening the other of said ports will be in communication with said outlet opening.

4. A pump as defined in claim 3 wherein said partition has an axial opening therethrough and said means for linking said plungers together comprises a shaft extending through said opening in said partition and having its ends connected to said plungers.

5. A pump as defined in claim 4 wherein said means for applying rotary movement to said cylinder structure comprises a sprocket member connected to said cylinder structure and a chain element engaging said sprocket member.

6. A pump as defined in claim 3 wherein said partition is diagonally disposed and said ports lie on opposite sides of said partition and approximately in a common plane perpendicular to the longitudinal axis of said cylinder structure.

References Cited in the file of this patent

UNITED STATES PATENTS

| | | |
|---|---|---|
| 837,342 | Ross | Dec. 4, 1906 |
| 868,703 | Ross | Oct. 22, 1907 |
| 1,232,159 | Fwicky | July 3, 1917 |
| 1,515,703 | Ross | Nov. 18, 1924 |